United States Patent [19]

Fischer

[11] Patent Number: 4,619,553
[45] Date of Patent: Oct. 28, 1986

[54] HIGH TEMPERATURE OIL BOOM COVER BLANKET

[75] Inventor: Edward M. Fischer, White Bear Lake, Minn.

[73] Assignee: Minnesota Mining and Manufacturing Company, St. Paul, Minn.

[21] Appl. No.: 726,519

[22] Filed: Apr. 24, 1985

[51] Int. Cl.⁴ .......................... A62C 1/00; B32B 1/08; B32B 18/00; E02B 15/04
[52] U.S. Cl. ........................................ 405/63; 169/48; 210/242.1; 210/923; 405/72; 428/36; 428/74; 428/193; 428/247; 428/251; 428/252; 428/255; 428/265; 428/266; 428/284; 428/285; 428/286; 428/287; 428/311.5; 428/319.3; 428/920
[58] Field of Search ..................... 405/63, 72; 428/36, 428/74, 76, 247, 251, 252, 255, 265, 266, 284, 285, 286, 287, 302, 311.5, 319.3, 920; 169/48; 210/242.1, 923

[56] References Cited

U.S. PATENT DOCUMENTS

| 4,062,191 | 12/1977 | Preus | 405/72 |
| 4,210,070 | 7/1980 | Tatum | 428/920 |
| 4,537,528 | 8/1985 | Simpson | 405/72 |
| 4,539,055 | 9/1985 | Ocutt | 428/36 |
| 4,556,593 | 12/1985 | Hughes | 428/76 |

FOREIGN PATENT DOCUMENTS 48204 4/1982 Japan .

Primary Examiner—James C. Cannon
Attorney, Agent, or Firm—Donald M. Sell; James A. Smith; Edward T. Okubo

[57] ABSTRACT

A high temperature oil containment boom cover blanket for conventional elongated cylindrical oil containment booms is disclosed. The cover blanket, when installed onto a conventional oil containment boom effectively converts the boom into a high temperature oil containment boom which allows for in situ burning of spilled oil during cleanup operations.

7 Claims, 3 Drawing Figures

HIGH TEMPERATURE OIL BOOM COVER BLANKET

BACKGROUND OF THE INVENTION

The present invention relates to a high temperature oil containment boom cover blanket for conventional oil containment booms which allows for the burning of spilled or leaked oil during offshore oil spill cleanup operations.

Conventional oil containment booms are elongated cylinders having a generally circular cross-section. These booms float in water with approximately one-third of the boom submerged below the surface of the water forming a floating barrier to the spilled oil. The booms are typically stored in a roll on the deck of a ship and deployed downwind of a spill where it floats on the surface of the water and temporarily contains the spill.

Early oil spill cleanup programs were directed to recovery of the spilled oil or to dispersal through the use of emulsifiers or surfactants. Recently, efforts have been directed to burning the spilled oil on the water surface. In order to burn the oil efficiently, the oil slick must be thickened and contained by the boom during the burning process when temperatures in the order of 1100° C. are common.

Two fireproof oil containment booms for in situ burning of oil spills were recently exhibited at the 1985 Oil Spill Conference held at Los Angeles, Calif., Feb. 25 to 27, 1985.

According to its brochure, the TTI Geotechnical Resources Ltd. Fireproof Oilspill Containment Boom consists of alternate rigid floatation units 1.668 m long, 1.78 m high weighing 108.8 kg and flexible (accordian folded) panels 0.906 m long, 1.70 m high weighing 102 kg connected together by connectors 0.07 m long, 1.67 m high weighing 10 kg. The boom is of stainless steel construction and the maximum exposure temperature is stated to be 980° C.

The available literature for the Globe International Inc. Pyroboom fireproof oil spill barrier states that it utilizes a unique blend of refractory and metallic materials in a woven fabric coated with a high temperature polymer coating (silicone rubber). Floatation is provided by a series of stainless steel hemispheres, containing a high temperature resistant, closed cellular material. Two such hemispheres with the woven fabric enclosed between them are bolted together to form spheres 16 3/16 inches (41 cm) in diameter spaced 34 inches (86 cm) apart at their centerlines along the length of the woven fabric. The boom has an overall height of 30 inches (76 cm) with a draft of 20 inches (51 cm) and a freeboard of 10 inches (25 cm), and weighs 8 to 10 pounds per lineal foot (11.9 to 14.5 kg/m). The operating temperature range of the boom is stated to be $-55°$ F. to $+2400°$ F. ($-48°$ C. to 1315° C.).

Another fire resistant oil containment boom system designated as the SeaCurtain ReelPak FireGard Oil-Fire Containment Boom System is described in a brochure issued by Kepner Plastics Fabricators, Inc. That boom system appears to comprise compartmented circular sections containing a continuous stainless steel coil wire covered with a double walled foam-containing refractory fabric with an additional portion extending downwardly from the circular section, the bottom edge of the downwardly extending section having a chain ballast member attached thereto. The boom is stored on a reel from which it is deployed. The boom is stated to have an operating temperature range from $-40°$ F. to over 2000° F. ($-40°$ to 1093° C.) and, depending on model, weighs 2.2 lbs. (3.1 kg) to 4.2 lbs. (5.9 kg/m).

SUMMARY OF THE INVENTION

The present invention relates to a high temperature oil containment boom cover blanket for conventional elongated cylindrical oil containment booms. The refractory materials comprising the cover blanket are capable of withstanding sustained exposure to temperatures of 1200° C., thus allowing in situ burning of the contained oil during offshore oil spill cleanup operations. The cover blanket can also be employed as a precautionary measure during the more traditional oil spill cleanup operations to guard against accidental ignition of the spilled oil.

The cover blanket of the present invention comprises, in laminar arrangement, an outer or top layer of a polymer coated high temperature resistant open weave refractory fabric, a sandwiched middle layer of a ceramic staple fiber refractory batt and an inner or bottom layer of a synthetic or fiberglass fabric which constrains the batt and assists in retaining the integrity of the fiber batt. The layers forming the cover blanket are unified by sewing with high temperature resistant ceramic thread or mechanical fasteners.

DETAILED DESCRIPTION OF THE INVENTION

Figure 1:
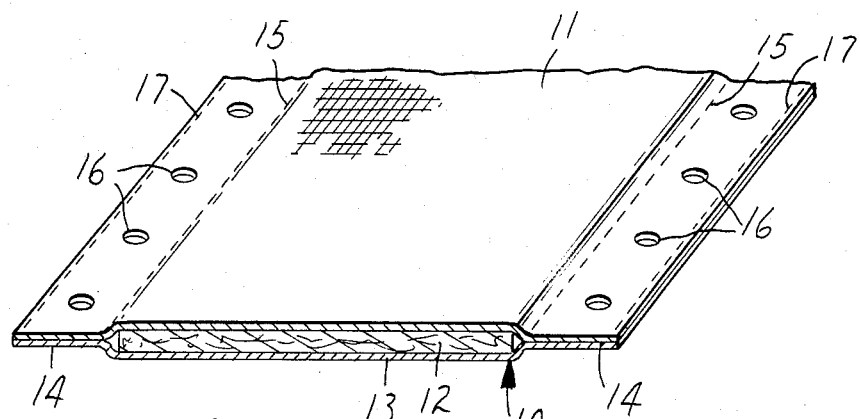
FIG. 1 is a perspective view, partly in section, of the cover blanket of the present invention.

Referring now to the drawings, high temperature oil containment boom cover blanket 10 is seen to comprise, in laminar arrangement, an outer or top layer 11 of a polymer coated open mesh high temperature resistant refractory fabric, a sandwiched middle layer 12 of a ceramic staple fiber refractory batt and an inner or bottom layer 13 of a synthetic or fiberglass fabric for constraining and assist in retaining the integrity of the middle layer 12.

High temperature resistant refractory fabric 11 is preferably a 1.29 mm thick open mesh, plain weave, 3×3 picks/cm fabric woven from 1800 denier, 1.5/4 plied continuous polycrystalline metal oxide fiber yarn comprising, by weight, 62% aluminum oxide, 14% boron oxide and 24% silicon dioxide and commercially available as Nextel 312 fibers and fabrics from 3M Company. The specific fabric 11 has a basis weight of 0.89 kg/m². Other fabrics which can be used as high temperature resistant fabric 11, provided they are similarly woven, include fabrics fabricated from Nextel 440 ceramic yarn comprising, by weight, 70% aluminum oxide, 28% silicon dioxide and 2% boron oxide (3M Company), Astroquartz ceramic fibers (J. P. Stevens) and leached fiberglass filaments (Hitco or Haveg).

High temperature resistant refractory fabric 11 is coated with a polymer coating such as a silicone rubber, a neoprene rubber or a fluorinated elastomer. The polymer coating serves to hold the yarns firmly in place during assembly and provides an abrasion resistant coating for the fabric 11 and provides protection to the cover blanket during shipping and storage and especially during installation of the cover blanket onto the boom and deployment of the then covered boom in use. A particularly preferred coating for the present invention is Neoprene GN (duPont), which is applied to the fabric 11 at a coating weight of 0.16 kg/m$^2$. The coating solution is applied by dip coating and coats the yarn while leaving the mesh interstices substantially open, allowed to dry and cured at a temperature of 160° C. before the fabric is incorporated into the cover blanket. It will be appreciated that the polymer coating when within areas exposed to the heat of combustion of the spilled oil, will be burned off but it will have served its processing and protection functions. Fabric 11 retains its high temperature characteristics even without the polymer coating.

The sandwiched middle layer 12 comprises a 12.7 mm thick refractory batt of $Al_2O_3$-$SiO_2$ Kaowool ceramic staple fibers (Babcock and Wilcox) of 128 kg/m$^3$ density. Other useful ceramic fiber batts include those available as Cerablanket (Manville Corp.), Fiberfrax (Carborundum Co.), Saffil (ICI Ltd) and other ceramic staple fiber batts which have the ability to absorb water.

The inner or bottom layer 13 comprises a 0.63 mm thick, high tenile strength, woven fiberglass fabric, Style 1583, weighing 0.54 kg/m$^2$ (Clark Schwebel). Other useful materials include fabrics of nylon, polypropylene or polyester. Layer 13 allows the cover blanket to be assembled into a unified structure by constraining the batt and retaining the integrity of middle batt layer 13 and protecting it from damage.

High temperature resistant refractory fabric 11 may, if desired, be provided with tightly woven edges 14, much in the manner of the selvage in ordinary woven fabrics, for reinforcement to facilitate strong attachment of the cover blanket to the oil boom.

Figure 2:
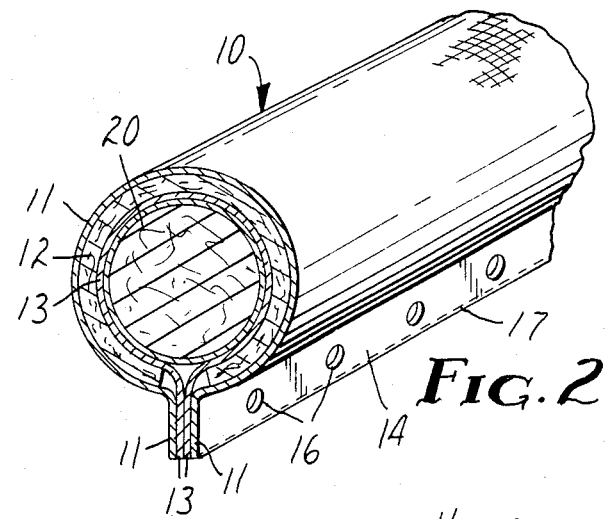
FIG. 2 is a perspective view, partly in section, showing the cover blanket of FIG. 1 installed on a conventional elongated cylindrical oil containment boom.
Figure 3:
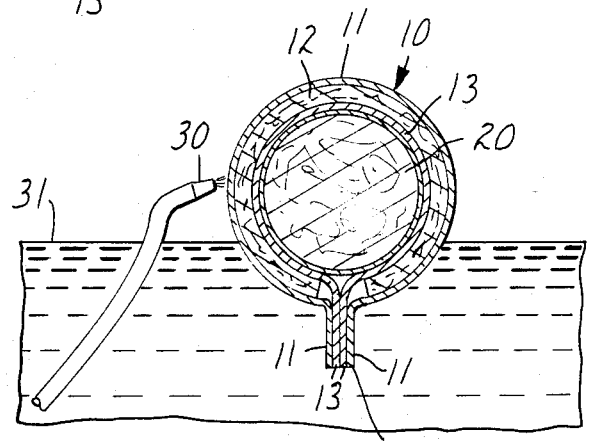
FIG. 3 is an end view, partly in section, showing the boom with cover blanket of FIG. 2 being fire tested.

Cover blanket 10 is fabricated by layerwise assembling a composite of bottom layer 13, middle layer 12 centered longitudinally on and along bottom layer 13, and top layer 11 in registration with bottom layer 13. The thus formed composite structure is unified by sewing along lines 15 immediately adjacent to and along the termini of middle layer 13 using a high temperature resistant ceramic thread such as Nextel AT 32 ceramic thread (3M Company). If desired, the outer (free) ends of the cover blanket could also be sewn together along lines 17 and the layers of cover blanket 10 could be further unified by providing spaced tufts or by additionally sewing the layers along spaced lines. Instead of sewing with the ceramic thread, a stainless steel wire could be used to similarly "sew" the structure or suitably spaced mechanical fasteners could be employed. Spaced apertures 16 may be provided along edges 14 for use in installing the cover blanket 11 onto boom 20. Cover blanket 10 is intended for use with any of the elongated cylindrical conventional oil containment booms and is, therefore, dimensioned so that it can be installed about the periphery of the boom 20, as shown in FIGS. 2 and 3. Certain of these conventional oil containment booms additionally have a depending weighted web member attached to the cylindrical portion of the boom, which mesh member is adapted to be suspended below the floating boom when the boom is deployed. On such booms with a depending mesh member, the cover blanket 10 would be attached to the boom by sandwiching the depending mesh member between edges 14 of the cover blanket 10.

The boom 20 illustrated in FIGS. 2 and 3 is a T-270 Sorbent Boom (3M Company) which is available in 10 feet×8 inch (3 m×20.3 cm) cylinders weighing approximately 10 pounds (4.5 kg). Each boom is provided with built-in connectors on each end to enable the boom sections to be linked together. Cover blanket 10 for such an 8 inch (20.3 cm) diameter boom measures 36 inches (91.4 cm) in width and has a weight of 1.98 pounds per lineal foot (2.95 kg/m).

In a typical use situation, as boom 20 is paid out from its storage container, cover blanket 10 is simultaneously paid out from its storage container and placed onto boom 20 with bottom layer 13 adjacent the surface of boom 20. Edges 14 of cover blanket 10 are passed around the periphery of boom 20 and joined together at the bottom of boom 20. Suitable mechanical fasteners such as stainless steel "hogrings" (staple like devices) are affixed in apertures 16 to hold cover blanket 10 on boom 20. Alternatively, a stainless steel wire of approximately 24 gauge can be threaded longitudinally through successive apertures 16 along the length of cover blanket 10. Various other methods of installing cover blanket 10 onto boom 20 will readily suggest themselves such as laying cover blanket 10 onto a flat surface such as a ship's deck, placing boom 20 onto the cover blanket and bringing the ends of the cover blanket together and fastening them.

Cover blanket 10, when installed onto a conventional oil containment boom 20, effectively converts the boom into a high temperature oil containment boom which allows for in situ burning of spilled oil during cleanup operations. The highly open mesh of the high temperature resistant fabric 11 allows water to freely penetrate into the ceramic fiber batt 12. The ceramic fiber batt 12 functions as a high temperature insulator for the boom 20. The free infiltration of water into the ceramic fiber batt 12 acts to cool the batt and thus increase its high temperature insulation ability.

In a laboratory fire test to measure the high temperature insulation effectiveness of cover blanket 10, a short section of a conventional boom 20 (T-270 Sorbent Boom) was covered with cover blanket 10 (which did not have the polymer coating on layer 11) and placed in water as shown in FIG. 3. A propane torch 30 equipped with a flame spreading nozzle was placed with the flame adjacent the surface of cover blanket 10 approximately 9 cm above the water line 31. The heated zone on the surface of the cover blanket measured 6.3 cm by 3.2 cm. An Omega 20 gauge Type K thermocouple (not shown) was placed on layer 11 at the center of the heated zone (point A) and another thermocouple (also not shown) was placed directly behind the first thermocouple on the surface of the boom 20 (point B). Temperature readings were taken at the time intervals shown in the Table.

TABLE

| | FIRE TEST DATA | |
|---|---|---|
| TIME MINUTES | TEMP. AT POINT A °C. | TEMP. AT POINT B °C. |
| 15 | 793 | 66 |
| 30 | 843 | 58 |
| 82 | 865 | 59 |
| 110 | 907 | 79 |
| 195 | 943 | 92 |
| 245 | 794 | 66 |

Upon completion of the fire test, layer 11 and the ceramic fiber batt 12 were undamaged. It will be observed that the cover blanket 10 was an extremely effective high temperature insulator for the boom 20.

To further evaluate the utility of cover blanket 10 under simulated use conditions, a 3.5 m long by 20.3 cm diameter T-270 Sorbent Boom (3M Company) was covered with the cover blanket 10 of the present invention but without the polymer coating on layer 11 and subjected to a mild river current with ice floes. For the 1.5 hours duration of the test, the covered boom maintained good freeboard and suffered no damage from the action of the ice chunks against the boom.

Although cover blanket 10 has been illustrated and described herein with a configuration wherein middle layer 12 is foreshortened and is not coextensive with layers 11 and 13, it is apparent that such a modification is within the contemplation of the invention. Various similar mode functions may readily suggest themselves and are contemplated.

What is claimed is:

1. A high temperature oil containment boom cover blanket comprising, in laminar combination, a top layer of a polymer coated open mesh high temperature resistant refractory fabric, a middle layer of a high temperature resistant refractory fibrous batt and a bottom layer of a woven fabric, said cover blanket being unified by having at least said top layer and said bottom layer secured together along their longitudinal edges.

2. A high temperature oil containment boom cover blanket according to claim 1 where said top layer comprises an open mesh fabric woven from a ceramic fiber yarn.

3. A high temperature oil containment boom cover blanket according to claim 2 wherein said ceramic fiber yarn comprises 62 weight percent aluminum oxide, 14 weight percent boron oxide and 24 weight percent silicon dioxide.

4. A high temperature oil containment boom cover blanket according to claim 3 wherein the yarn comprising said refractory fabric is coated with a polymeric coating of a silicone rubber, a neoprene rubber or a fluorinated elastomer.

5. A high temperature oil containment boom cover blanket according to claim 4 wherein said middle layer comprises a refractory batt of ceramic staple fibers, said batt having the ability to absorb water within the interstitial spaces of the batt.

6. A high temperature oil containment boom cover blanket according to claim 5 wherein said bottom layer comprises a woven fabric of fiberglass, nylon, polypropylene or polyester.

7. A high temperature oil containment boom capable of sustained exposure to flames with temperatures in the order of 1100° C. comprising, in combination, an elongated cylindrical oil containment boom enveloped by the cover blanket of claim 6 such that the elongated cylindrical oil containment boom is not directly exposed to said flames.

* * * * *